US006457100B1

(12) United States Patent
Ignatowski et al.

(10) Patent No.: US 6,457,100 B1
(45) Date of Patent: Sep. 24, 2002

(54) SCALEABLE SHARED-MEMORY MULTI-PROCESSOR COMPUTER SYSTEM HAVING REPETITIVE CHIP STRUCTURE WITH EFFICIENT BUSING AND COHERENCE CONTROLS

(75) Inventors: Michael Ignatowski, Red Hook; Thomas James Heller, Jr., Rhinebeck, both of NY (US); Gottfried Andreas Goldiran, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/396,319

(22) Filed: Sep. 15, 1999

(51) Int. Cl.[7] .............................................. G06F 12/00

(52) U.S. Cl. ...................... 711/119; 711/122; 711/129; 711/130

(58) Field of Search .................................. 711/119, 121, 711/122, 130, 147, 148, 152, 104, 105, 127, 129, 141, 153

(56) References Cited

U.S. PATENT DOCUMENTS

| 5,210,844 | A | * | 5/1993 | Shimura et al. ............. 711/153 |
| 5,261,066 | A | | 11/1993 | Jouppi et al. ................ 711/122 |
| 5,265,232 | A | | 11/1993 | Gannon et al. ............. 711/122 |
| 5,303,362 | A | | 4/1994 | Butts, Jr. et al. ............ 711/121 |
| 5,327,548 | A | * | 7/1994 | Hardell, Jr. et al. ......... 711/147 |

(List continued on next page.)

FOREIGN PATENT DOCUMENTS

| EP | 0 708 405 A1 | 9/1995 |
| EP | 0 708 398 A2 | 10/1995 |
| EP | 0 708 406 A2 | 10/1995 |

OTHER PUBLICATIONS

"The Directory Based Cache Coherence Protocol for the DASH Multiprocessor" by D. Lenoski et al, the 17th Annual International Symposium on Computer Architecture, May 28–31, 1990, pp 148–159.

The Intel 80860 Chapter 14 article, pp. 359–354.

*Primary Examiner*—Matthew Kim
*Assistant Examiner*—B. R. Peugh
(74) *Attorney, Agent, or Firm*—Lynn L. Augspurger; Bernard M. Goldman

(57) ABSTRACT

A novel structure for a highly-scaleable high-performance shared-memory computer system having simplified manufacturability. The computer system contains a repetition of system cells, in which each cell is comprised of a processor chip and a memory subset (having memory chips such as DRAMs or SRAMs) connected to the processor chip by a local memory bus. A unique type of intra-nodal busing connects each system cell in each node to each other cell in the same node. The memory subsets in the different cells need not have equal sizes, and the different nodes need not have the same number of cells. Each node has a nodal cache, a nodal directory and nodal electronic switches to manage all transfers and data coherence among all cells in the same node and in different nodes. The collection of all memory subsets in the computer system comprises the system shared memory, in which data stored in any memory subset is accessible to the processors on the other processor chips in the system. Each location in the system shared memory has a unique real address, which may be used by any processor in the system. Thus, the same memory addresses may be used in the executable instructions of all processors in the system. The nodal directories automatically manage the coherence of all data being changed in all processor caches in the computer system, regardless of where the data is stored in the shared memory of the system and regardless of which cell in the system contains the processor changing the data to provide data coherence across all nodes in the computer system.

31 Claims, 7 Drawing Sheets

U.S. PATENT DOCUMENTS

| | | | |
|---|---|---|---|
| 5,379,394 A | | 1/1995 | Goto .......................... 710/126 |
| 5,524,212 A | | 6/1996 | Somani et al. .............. 711/121 |
| 5,535,417 A | | 7/1996 | Baji et al. .................... 710/22 |
| 5,659,714 A | * | 8/1997 | Yoshida ...................... 711/211 |
| 5,669,008 A | | 9/1997 | Galles et al. ................ 712/12 |
| 5,796,605 A | | 8/1998 | Hagersten ................... 364/134 |
| 5,895,487 A | * | 4/1999 | Boyd et al. ................. 711/122 |
| 6,055,605 A | * | 4/2000 | Sharma et al. ............. 711/130 |
| 6,108,737 A | * | 8/2000 | Sharma et al. ............. 710/107 |
| 6,209,065 B1 | * | 3/2001 | Van Doren et al. ......... 711/150 |

* cited by examiner

FIGURE 3: NODE CONFIGURATION

FIGURE 4: MULTIPLE NODE SYSTEM WITH UNSHARED BUSES

FIGURE 5: MULTIPLE NODE SYSTEM WITH SHARED BUSES

FIGURE 6: PHYSICAL ADDRESSING

FIGURE 7:
L1 DIRECTORY ENTRY
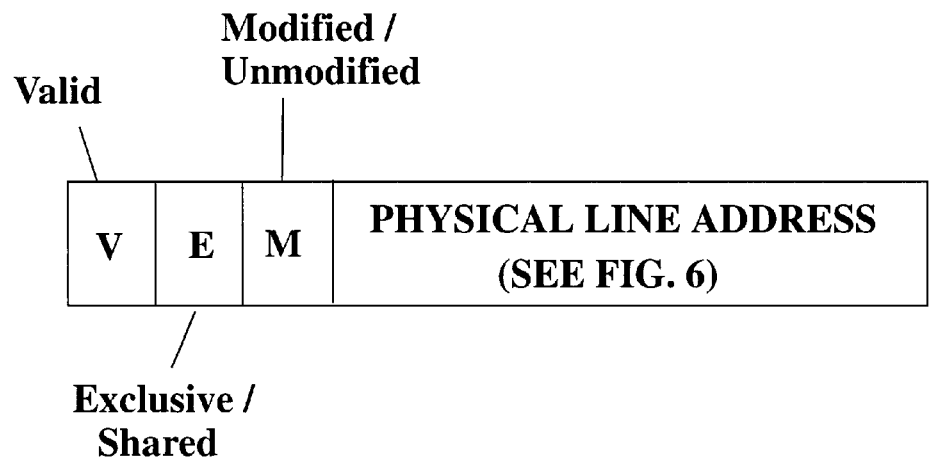
NODAL DIRECTORY ENTRY
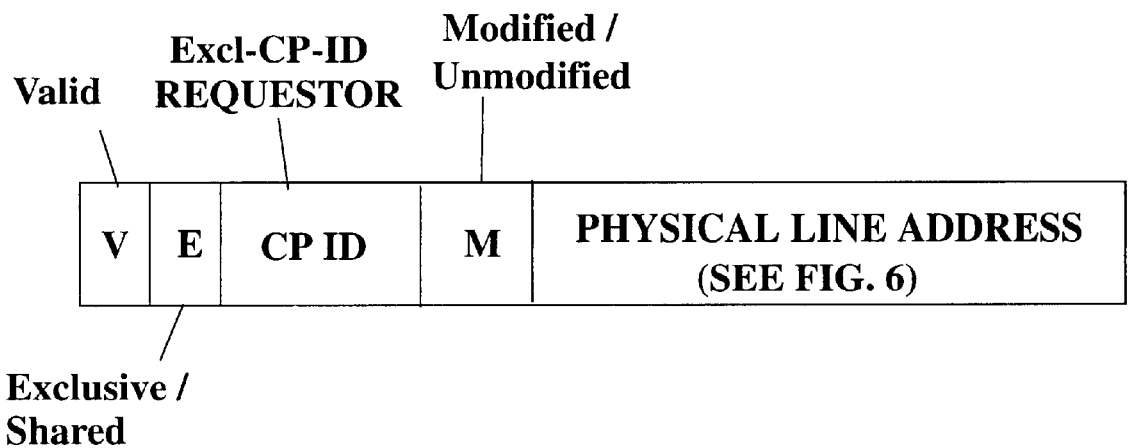

SCALEABLE SHARED-MEMORY MULTI-PROCESSOR COMPUTER SYSTEM HAVING REPETITIVE CHIP STRUCTURE WITH EFFICIENT BUSING AND COHERENCE CONTROLS

This invention provides a novel non-hierarchical nodal structure for a highly-scaleable high-performance shared-memory computer system having simplified manufacturability. The invention supports a large range of system scaleability using a small number of types of hardware chip components. The system may include a large number of replicated processor chips of each of these types, in which a large system memory is shareable by all processors in the system. The large shared memory is generally comprised of subsets of DRAM chips respectively connected to the processor chips (though other types of memory technology such as SRAM can be substituted). Data in any DRAM subset is accessible to any processor in the system using the same address in an instruction being executed by any processor. Thus, the same memory addresses may be used in the executable instructions of all processors in the system. A unique type of memory busing connects each processor chip to a respective subset of DRAMs in the shared memory to enable faster memory access by the processor directly connected to the DRAM subset. Bus conflicts commonly occurring in shared memories with prior art memory bus designs are minimized by this invention, even though all of the DRAMs in the same shared system memory are addressable by all processors. The subsets of DRAMs need not have equal sizes. A group of the DRAM subsets with their directly connected processors comprise a node of the shared-memory system, in which each node may have a nodal cache with a nodal directory and nodal electronic switches. Multiple nodes may be connected together by internodal buses connected between the nodal caches of the nodes, while including all nodes within a single distributed shared-memory system, in which the nodal directories manage processor accesses to/from, and the coherence of data in, all nodes comprising the system shared memory.

BACKGROUND OF THE INVENTION

Prior Memory System Limitations

This invention does not use any communication links or a "message protocol" to communicate among its nodes, as is often found in prior art nodal systems. Prior systems often provide a memory in each node operating independently of the memory in any other node, which therefore cannot be an internodal shared memory. Such prior systems may include an intra-nodal shared memory within a node limited to being shared only among the processors within its single node. Such prior systems do not allow, and cannot allow, access to their so-called share memories by a processor in a different node without violating coherence requirements in a system essential to preserving the integrity of the data in the memories.

On the other hand, the subject invention allows internodal access to all of its nodal DRAMs by a processor in any node in a system while assuring system coherence of all data in all of the DRAMs in all nodes of the system. Further, the subject invention combines multiple and separately connected DRAMs into a single shared memory whether the DRAMs are in a single node system or in a multiple node system, which are usable by all processors in all nodes of the entire system. Thus, a processor in any node of this invention can address and access data located in any other node by a direct memory access, which access may occur during processor execution of an instruction requiring an operand stored in a DRAM in a different node. No messaging, or packet processing, is used by this invention to access data in a node or between different nodes of a system.

Without internodal cache coherence controls, accessing data from another node could destroy system data integrity. When data is copied between independent nodal memories for execution without adequate coherence controls, there is no assurance that the value of copied data items will not be change in a way uncoordinated with its other copies in the system that could adversely affect the integrity of the data in the system. Coherence controls prevent unknown versions of copies of a data item from being used that may result in obtaining false processing results. The majority of prior art on coherency controls deals with intra-nodal shared memories where a single centralized mechanism is used to maintain coherency.

The prior art dealing with internodal shared memories and distributed coherency mechanisms generally deal with one of three topics: 1) interconnect topologies scaling to a large number of nodes with little attention to the details for maintaining cache coherency across nodes, 2) interface components to interconnect the nodes to an interconnect network, again with little attention to the methodology of maintaining cache coherency across nodes, or 3) maintaining internodal cache coherency through the use of special coherency directories, coherency information stored with the memory arrays, or other special interface and switch components which add extra costs and complexity to the system design and packaging.

In the prior art, shared memory computer systems use hardware coherence controls for checking all operand accesses to detect and control all changes to data anywhere in the shared memory for maintaining the integrity of the data. Coherence checking assured that a data item stored anywhere in the shared memory provides at a given time the same value to all processes using the data item, regardless of which process or processor in the system changes or uses the data item, and regardless of which part of the shared memory stores the data item.

However the design of the conventional shared-memory controllers in prior shared-memory systems limit the scaleability of a system, because conventional controllers are generally designed for the maximum number of processors and maximum size memory, so that they may be scaled up to that maximum size system, even though the controller is installed in a system configuration having smaller number of processors and memory size. As a consequence, the initial cost of such conventional controller does not decrease for system sizes below the maximum, which restricts such conventional systems to a very narrow range of processor and memory scaleability.

Conventional shared-memory controllers often have a common bus provided between the memory controller and the shared memory. The common bus is shared by a large number of processors, and sometimes all processors, in the system. This bus sharing causes bus contention among all concurrent memory addresses concurrently contending for the bus, and only the winning address gets the next access to the shared memory. This all-address conflicting-bus controller design suffers from bandwidth limitations, decreasing the speed of concurrent access requests by multiple processors to the shared memory. Also, latency penalties are suffered while processors are waiting for their access request to use the conventional controller's shared bus. Such prior common storage controller bus designs must therefore be initially built for handling maximum traffic on the bus by the maximum number of processors in a system, which increases the cost of smaller systems using the same memory controller and its busing. Continued increases in semiconductor processor speed have increased the bandwidth and latency mismatch between the processors, their storage controller, and their common bussing in prior art shared memory systems.

An example of a common bus provided between a memory and multiple processors within the same node is disclosed in U.S. Pat. No. 5,524,212 to Somani et al which provides a centralized arbiter of a shared memory bus within its shared memory bus controller for controlling a common memory bus internal to a node. That patent does not disclose inter-nodal shared memory.

Recent trends in semiconductor technology and software design are making more severe the above-described bus conflict problems. The speed of on-chip CMOS circuits is increasing faster than the speed of off-chip drivers and associated buses. Many prior art designs already have internal processor speeds that are many times that of the off chip bus speeds, and the disparity will soon get worse. These slow buses add latency to the main storage accesses.

New programming techniques are creating code which is larger than previously contemplated, and their code often executes with memory reference patterns which average more cache misses per instruction executed than occurred with prior software. The additional cache misses will cause increased software queuing, and therefore latency, during main storage accesses. Greater numbers of concurrent/simultaneous accesses to shared main storage by an increasing number of processors will be required in the future because of the trend towards greater requirements in large systems. Many software workloads are being enabled for higher levels of multiprocessor execution which tax the limits of conventional system designs. Particularly, the use of additional processors and shared main memory size per system will put much more stress on the memory hierarchy accessing rate of a system.

The word "node" is noted to have many diverse and unrelated meanings in the prior art. A common use in the prior art found for the word "node" is in communication networks, in which a network comprises multiple independent "nodes" connected by communication links that transmit packets of data between the "nodes", and each node is an independent hardware computer system having its own independent operating system, wherein each "node" may be what is often called a "central electronic complex" or a "central processing complex". A different meaning for the word "node" is commonly found in the software prior art, in which "node" is often used to represent a software construct containing one or more address pointers for locating one or more other nodes in a multi-nodal software arrangement. And, there are other meanings in the prior art for the term "node". It therefore is important to recognize that the word "node" should only have the meaning indicated within the specification in which it is being used. For these reasons, great care is required in trying to transfer a meaning of the term "node" from a prior art document to the subject specification.

In this specification, the word "node" represents a section of a single computer system, which is comprised on one or more "nodes" (i.e. one or more sections) connected by "inter-nodal" (i.e. inter-sectional) buses. If initially comprised of a single section, one or more additional sections may be added later and connected by inter-sectional buses to the initial section for expanding the capacity of the computer system. Adding additional sections ("nodes") does not change the single computer system characteristic in which all "nodes" (i.e. sections) are capable of being managed by a single operating system. That is, in the subject specification, each "node" in a plural node system is one of the "sections" within a single computer system. Within this single computer system, each of the plural "sections" is comprised of a plurality of "system cells", in which each cell is comprised of a processor chip and a local memory (e.g. DRAMs) connected to the chip by a local bus. Each processor chip contains at least one central processor and may contain multiple central processors. All or some of the system cells in any section of the computer system may or may not contain an I/O interface. If a cell contains an I/O interface, it may be supported by providing an I/O processor on the chip, or by having a central processor on the chip perform the I/O function to provide an I/O interface (in addition to its central processing functions).

SUMMARY OF THE INVENTION

An object of the subject invention is to greatly reduce memory bus contention in a computer system by providing a unique computer system design, which connects within each of plural processor chips a subset of the system shared memory comprising a subset of DRAMs to a subset memory controller. This design has several advantages, including a large reduction in memory bus contention. This bus contention reduction is obtained by providing a large number of memory buses in which each bus handles only a relatively small range of real addresses within the address range of the shared memory. This is done by assigning a small range of the addresses in the system shared-memory to the subset of DRAMs connected to each processor chip in the system. A large number of processor chips may be provided in a system, each having its connected subset of DRAMs with its own memory bus servicing only its respective subset of DRAMs. This compartmentalizes the shared memory into a significant number of subsets of DRAMs, each having a different small address range in the system shared memory. Thus, each small range has its own memory bus and its own memory controller, which enables a great reduction in memory bus contention within the system by enabling simultaneous memory accesses on the different processor-chip memory buses servicing the different address ranges.

For example, if there are 20 processor chips in a system, the system will have 20 subsets of DRAMs connected to 20 buses which are connected to 20 memory controllers on the 20 processor chips. If the overall shared memory range is from 0 to 1 gigabyte of real memory, then each DRAM subset may be assigned a different 20 megabyte range of addressing within the 1 gigabyte range. Then, 20 different processes may be simultaneously executing on the 20 different processor chips, which may be simultaneously accessing their local subsets of the shared memory in the 20 different ranges.

On the other hand, a prior art designed system may have one or two memory controllers which may provide a common bus between all (e.g. 20) processors and the system shared memory, in which the common bus allows only one access at a time by the 20 processors, constraining 20 simultaneous access requests by the 20 processors to merely one access at a time to the 1 gigabyte memory—compared to the 20 simultaneous accesses at a time to the system shared memory in the preceding example of operation of the subject invention. This example shows how the subject invention can provide a nearly 20-times increase in the overall system bandwidth for shared memory accessing, compared to the overall memory system bandwidth of systems using conventional common bus designs.

Furthermore, the subject invention can easily scale the overall system-memory bandwidth for a system by adding or subtracting processor chips and/or the number and size of their connected DRAM subsets comprising the system shared memory.

Another object of the subject invention to provide a unique organization for a single system's shared memory. This memory organization partitions the subsets of DRAMs (and their separately connected processor chips) into one or more nodes, which comprise the shared memory system. Each node is responsible for controlling access to and maintaining coherency for the data in those DRAMs directly attached to that node. When more than one node is provided in a system, each of the nodes may have any number of processor chips and each processor may have any number of DRAMs in its subset. Although the preferred implementation of this invention provides the same number of processor chips in each node of a system, and provides the same number of DRAMs in each subset, it should be understood that the choice of equal numbers of processor chips and DRAMs per node is not required by the subject invention. For example, the initial structuring of a system may provide an equal numbers of processor chips and DRAMs in each of plural nodes in a system, which later may have any node scaled to a larger (or smaller) size by changing the number of processor chips and/or DRAMs, resulting in having different size nodes (e.g. one or more of the nodes containing a different number of processor chips and/or DRAMs than found in other of the plural nodes of the system.

In a nodally partitioned shared-memory system, this invention provides a "common directory" within each node of the system. Each common directory represents its node and may be considered to own all DRAMs connected to all processor chips within the same node. When a shared memory system is comprised of more than one node, one or more "internodal buses" are connected between the common directories in the different nodes. These inter-nodal buses communicate control signals and data between the common directories of the shared memory system. Thus, the shared-memory of a system includes the DRAMs in all nodes in the system.

The bus-speed mismatch found in current shared memory systems is greatly reduced by the subject invention. This is due to this invention's use of independent shared-memory DRAM subsets respectively connected to separate memory-controller buses integrated into each of the processor chips, which allow the processors in the chips to make non-conflicting parallel accesses in the shared memory, enabling a great increase in the overall memory access rate without the memory bus conflicts usually found in conventional systems. In conventional systems, the memory access rate per processor decreases as the number of processors is increased in a system, due to the serialization of memory accesses to avoid conflicts among concurrent processor access requests. On the other hand, this invention does not significantly decrease the memory access rate per processor as the number of processors in the system is increased. That is because its unique shared memory design provides a separate bus for each processor to a separate section of the shared memory to enable the different processors to be assigned non-conflicting sections in a single shared memory. Hence, the subject invention allows the overall system memory access rate to the system shared memory to increase substantially proportionately to the number of processors in the system, unlike conventional shared memory systems which have their overall system memory access rate limited due to the reduction in access rate per processor as the number of processors is increased. For these reasons, this invention provides a significant increase in system performance in comparison to conventional systems.

Furthermore, this invention greatly decreases the cost/performance ratio for systems using this invention, compared to conventional shared memory systems. This is due to the way this invention allows the same chip types to be replicated for increasing the size of a shared memory system. That is, the same processor chip type may be used with all DRAM subsets in a system, wherein each processor chip may have an identical processor, an identical memory controller, and identical private processor cache, and one or more identical input/output (I/O) ports for connecting external I/O devices to the local DRAM subset connected to the respective processor chip.

The processor-chip memory controller design allows a subsetting of the overall memory controller function for the system shared memory. This memory controller subsetting is also important to enabling system costs to directly vary with the system resources needed by the system. The resulting system design provided by this invention enables system manufacturing costs to vary substantially proportionally with increases in the replication of the same chip types (i.e. having the same part numbers), which does not happen with conventional shared memory systems which have their costs constrained by their common memory designs. This invention enables system costs to range from a low system cost where a system needs only a minimal number of processors and memory size, up to a proportionally higher system cost where a system needs a large number of processors and memory size.

Thus system costs are significantly affected by the methods used by this invention in making the shared-memory access rate in a system much less dependent on the number of processors in the system, while enabling the use of replicated chips throughout the system structure. This causes a significant decrease a system's cost/performance ratio, compared to conventional shared memory systems. At the same time, the subject invention greatly increases the scaleability of its shared memory computer systems.

The novel structure provided by this invention for a shared-memory computer Systems enables the novel computer systems to be manufactured with only minimal types of parts which may be easily replicated to expand the size of computer systems to very large sizes with greatly increased performance whenever a decision is made to increase the size of the computer system. That is, this invention supports the manufacture of shared-memory computer systems from a relatively small size to a very large size (typically associated with "mainframes"), and these different size computer systems are all potentially made by replicating only a small number of identical types of parts which can be manufacture at a low cost.

The scaling feature of this invention enables system expansion (or contraction) by replication of the parts of this invention in a novel arrangement for a shared memory system, which can be comprised of one or plural system nodes without the need to have additional types of computer parts.

Another object of the invention is to solve internodal coherence problems in an internodal shared memory. Coherence controls are provided in internodally-connected common directories (connected by inter-node buses) in a manner which solve the internodal data coherence problem in the system. A common cache with each common directory may store a copy of a data line. The owning directory has the primary coherence responsibility for a line of data, but another common directory (for another node) may contain a copy of the data line to reduce internodal traffic which increases the system efficiency.

The number of nodes and the size of the node(s) in a system may be selected over a large range by replicating the same computer part numbers, e.g. by increasing the number of processor chips, by increasing the number or size of DRAMs connected to each processor chip, by adding another nodal cache section for each added processor chip, and adding busing between each added processor chip and a nodal cache section. Each node contains a memory hierarchy structure with a private cache in the processor chip for use by the processor in the chip, and a nodal cache, and DRAMs connected to each processor chip in the node serving as the system shared main memory to provide three hierarchy levels in each node. Also, a number of input/output (I/O) interface connections are provided in each processor chip and the I/O Interface is integrated in each processor chip.

Each node is comprised of parts which may be replicated in the node to increase the size of the node. The replicated parts include: a processor chip (integrating a central processor with a private cache, a sectionalized shared-memory controller entity and an I/O interface entity), DRAMs connected to each processor chip, a nodal cache directory chip, and a nodal cache section chip. High memory access bandwidth with low latency accesses are obtained due the subject inventive structure avoiding the memory bus interference previously occurring in prior shared-memory systems that utilize a common memory bus requiring serialized prioritization among concurrent memory access requests.

The overall size of the shared memory may be changed in different ways. One way changes the size of each DRAM (dynamic random access memory), and/or number of DRAMs connected to each central processor within any node. Another way changes the number of nodes in a system with or without changing the size of the portion of the shared-memory in each node (connected to each central processor in any node).

Thus, the size of a nodal system made according to this invention may be scaled both intra-nodally and inter-nodally to increase (or decrease) the size of a shared memory system. Intra-nodal changes change the number of central processors and their private caches, the number of sections in a nodal cache, the number of input/output (I/O) interface connections to the system, within any node of the system. Inter-nodal changes change the number of nodes comprising the system.

This invention provides expandable intra-nodal busing within each node of a shared-memory system to enable different numbers of central processors to be connected to sections of a nodal cache function, in which the number of cache sections may be varied separately from the number of processor chips within the node. An electronic switching function (crosspoint switch) is provided with each section of the nodal cache function to match each section of the cache function to each of the processors in the node. Further, the electronic switching function can bypass the nodal cache in the node to speed up an access by any processor in any node to data stored in any memory subset in any node.

Also in each node, a nodal directory function is connected to all of the cache sections in the node to locate data lines stored, or to be stored, in the nodal cache, and to maintain data coherence for all such data.

The number of processors may be unequal among the nodes, although it may be preferred to at least initially have equal numbers in each node. A fairly large total number of processors may be included in all nodes of the system, although as a practical matter a cross-interrogate penalty is paid in system performance as more processors are added, since, for example, more processor chips may have to be accessed if a shared data line needs to be invalidated for giving control of the data line to a particular processor requesting change authority for writing in the line.

The shared-memory computer system of this invention can be adapted to use any computer architecture for enabling the computer hardware to execute any software usable under an adapted architecture.

Different types of internodal busing arrangements are disclosed herein for connecting together the nodes of a multiple node system to provide tradeoffs in busing costs and busing performance in a shared-memory internodal system. The buses may also be replicated using the same part number for identical buses.

Therefore, replicated buses and semiconductor chips for each node perform: a processor function, an nodal cache function, an nodal directory function and an electronic switching function. The processor function in each node is provided by replicating one or more processor chips in the node, in which each processor chip contains one or more central processor(s), a private cache and directory for each processor, a memory controller for connecting memory DRAMs to its central processor(s), and an I/O interface for connecting I/O devices to the central processor(s). The DRAMs may be any type such as EDO, fast page, SDRAMs, etc. The I/O interface need not be provided or used in all processor chips if it is not needed with all central processors.

The DRAMs connected to any central processor in each node of a system can be directly accessed by any instruction executing on any central processor in the system. If virtual addressing is used by an executing program on any processor in the system, that processor will translate each virtual address to a real address, which will then be used to access the DRAMs containing that real address. In this invention the real address of each storage operand in any instruction being executed by any central processor in any node of a multinode system will identify the particular processor DRAMs storing the operand. This can be done by implementing enough flexibility in system configuration controls to assign a system wide unique address range to each set of DRAMs. More typically though the same local DRAM addresses may be repeated in all subsets of DRAMs (typically starting with address "zero").

To define unique address in the hardware for the preferred embodiment, each local byte address in each DRAM subset has concatenated to it the node identifier and processor chip identifier of its DRAM-connected processor chip However, most programs rely on using a contiguous range of unique real addresses to define all byte locations in a system shared memory. It is awkward for system programs to use node-IDs and processor-IDs with the DRAM addresses as program real addresses for accessing operands in a shared memory. Therefore a physical address translation table is provided to all processors in the system to translate real addresses generated by programs to local DRAM addresses concatenated with the processor and node-IDs that specify where the DRAM is located.

The physical address translation table may be implemented in hardware registers, or in a microcode area reserved in each subset of DRAMs connected to each processor chip. It is replicated for each processor in the system, so that each processor has parallel access to its own physical address translation table. Then, all processors in the system may be determining physical addresses in their executing programs independent of, and without any interference from, the other processors in the system.

In the preferred implementation of this invention, the nodal cache in each node is a second level cache function comprised of one or more nodal cache section chips. The number of nodal cache sections in the nodal cache function of a node is determined by the size of the data transfer between the processor chips and nodal, and by the bit storage capacity provided for each nodal cache section chip. The same integral number of bits per data transfer is chosen for each of the section chips to enable all nodal cache section chips to be identical so that they can be manufactured with the same part number. The number of nodal cache sections is independent of the number of processors in the node.

The data lines stored in each nodal cache function will generally be the lines most frequently accessed by the processors in the local node, and these data lines are managed by an nodal directory (which is the common directory of the node).

The subsets of DRAMs contained in a node (i.e. local to a node) are herein considered owned by the common directory in that node. The node containing (local to) the DRAMs is considered herein to be the home node, and it contains the home directory. The home directory owns all memory locations in the DRAMs within its node, and has the responsibility for maintaining the coherence for those locations. Accordingly, if a system has DRAMs in the plural nodes, each node contains a part of the shared memory; and the common directory of each node only owns part of the DRAMs in the shared memory. Nodes other than the home node for a given address are referred to as remote nodes.

But any processor in any node can access data stored anywhere in the system shared memory whether stored in DRAMs local to the node, or in a remote node. That is, data lines stored in any DRAM subset in the system may be copied and the copy transferred to a remote nodal cache function in the node of a requesting processor, and then to the private cache of the requesting processor. Multiple copies of a data line may be temporarily stored in plural nodal cache functions in multiple nodes This enables the caches closest to each requesting processor to contain a copy of a data line currently being used in parallel by plural processors to provide the fastest system performance. However, only one of the nodal common directories will be on the home node, and the home node has the responsibility for maintaining system coherence for the data line, such as controlling invalidations of all excess copies of a data line in the system for which a processor is requesting store authority.

An access authority request is also included with each memory access request. The requested authority may be shared authority (read-only requests, typically for instruction fetches), or exclusive authority (allowing stores into the cache line, typically for store or lock requests), or cond-excl authority (conditionally exclusive for operand fetch requests, which may often later be followed by a store request to that line).

Controls with each nodal directory maintain the coherence of all data accessed in its owned DRAMs, and may take a secondary roll in assisting coherence control for non-owned data lines currently being used by processors in the node. The nodal directory controls receive an "authority request" with each received processor address command. Although data coherence for shared, exclusive and cond-excl authority is generally taught in the prior art, the subject invention provides novel controls for handling coherence checking in local and remote nodes of a shared memory system.

If a request misses in the processor's private directory, the request (with the looked-up requested node-ID), processor-ID and requested DRAM address for the home node of that data) is sent to the requesting processor's local nodal directory. If the request hits in that nodal directory of the requesting processor, the requested access authority is checked, and if approved, a copy of the associated data line, or a required part of the line, is transferred from the connected nodal cache to the private cache of the requesting processor.

If the line is not present in the local nodal directory, or if there is a conflict with the requested access authority or the present state of the line in the nodal directory, then the home node for that address must initiate a fetch the data from memory or another cache location, and cache coherence is maintained system wide for that data.

An electronic crosspoint-type switch is contained in each nodal cache section chip in association with the nodal cache section contained on the same chip. The electronic switches control all data and control transfers between the local nodal cache sections and any local processor chip, or between the local nodal cache sections and the remote nodal cache sections in the node containing a requested/requesting remote processor chip. Thus, if a line is requested of a remote processor, its remote nodal cache sections then transfer the line sections through its electronic switch to/from the requested remote processor chip.

The preferred nodal structures comprise customized chips and buses which are replicated, and their replication is managed by assigning the same unique part number to each replicated chip or bus of the same design. In the preferred implementation, the same part number is assigned to each replicated processor chip, each nodal cache section chip (containing a nodal cache section and an electronic switch), each nodal control chip (containing a nodal cache directory and nodal controls), each type of bus used to connect the chips, and each type of bus connector connected to a chip for connecting buses to pins on a chip. In the preferred implementation, one nodal control chip is used to control the coherence of all DRAMs owned by the same node. The nodal control chip of any node communicates with all of the processor chips in the same node, with all of the nodal cache section chips in the same node, and through internodal bus(es) with the Nodal control chips of each other node in the system.

Either a store-in protocol, or a store-through protocol, may be built into each private cache on each processor chip. The store-in cache protocol is preferred herein because it greatly reduces interference at the nodal directory and nodal cache function. It is also preferred that the nodal caches all be store-in caches to greatly reduce internodal bus traffic.

Although the nodal bus transfers may be bit parallel for subline units and serial for the subline units in each data line, other well known ways of data transfer may instead be used in this invention, such as parallel-by-bit for all bits in each data line (found to be the fastest current type of data transfer).

This invention physically splits an overall shared-memory control function of a system into a plurality of processor chip memory-controllers (MCs), one MC per processor chip, which connects to the subset of DRAMs assigned to the processor chip.

The range of real storage addresses is assigned to the DRAMs connected to a processor chip need not be contiguous byte addresses, although that is generally preferred. The same set of DRAM addresses may be provided in each node, although this is not a requirement of this invention, which also allows the nodes to have different ranges of DRAM addresses. If the DRAMs in different nodes have the same or overlapping addresses, they are made unique addresses in the system by generating the previously described physical address translation table when the system is being configured, and each time any DRAM is changed in any node. Thus, the number of shared memory controllers in a system may be changed at a future time when adding or deleting processor chips and connected DRAMs, the number or size of the DRAMs connected to any processor chip may be changed a future date in any node or all nodes. Whenever any DRAM is changed in the system, the "physical address translation table" is then regenerated to include all existing DRAMs after the changes are made, in order to re-assign the contiguous addresses in the system share memory of all nodes.

The system's shared-memory size is the sum of the DRAM space configured into the shared system memory for each of the processor chips in all nodes of the system, which generally is the sum of all of the DRAM space in all nodes less the DRAM space reserved for other functions, such as to store microcode for the connected processor.

It is common practice in the prior art to divide the space in each page frame into data lines, for which each data line has all of its bits accessed in parallel in the DRAMs containing the page frame. Each data line may then provide a unit of memory access on a memory bus. The bits in each data line are partitioned into bytes which are the units located by byte addresses in the system shared-memory. The hardware address of a byte location in a data line in the subject system's shared memory (requested by any processor) may be comprised of a concatenation of the following address components: a requested node-ID and a requested processor-ID (which locate the DRAM subset containing the target address), a line number identifying a line location in the DRAMs of the requested processor, and a byte number in the line (for locating the target byte of the requested address) (see FIG. 6.). It is preferable, but not theoretically essential, that the numbers used in these address components be powers of two.

An important novel feature of this invention is the way this invention compartmentalizes its shared-memory among its processor chips to support an easily expandable, variable size shared memory. This novel arrangement also provides compartmentalized shared-memory controllers, which enable the elimination of conventional total memory controller chips which are expensive and are currently used in large multiprocessor systems. The use of compartmentalized shared-memory controllers by this invention can significantly improve the cost-performance of large computer systems by making the memory controller cost proportional to the size of memory being controlled, as it provides for easy expansion by any processor of its portion of a system shared memory. Expansion of the subject memory controller size is made only a function of the number of processor chips in the system, and the size of the system shared memory can be changed by: changing the size of any node by expanding (or reducing) its number of its processor chips, adding more nodes to a system.

Also, the system main memory capacity and connectivity may be changed without requiring any change to any memory-controller chip by connecting more DRAMs to any processor chip, and more processor chips containing connected DRAMs which add to the size of the system main memory.

Thus, the system main memory size and processor capacity and connectivity can be increased to very high levels of capacity and system performance. The memory capacity can easily be tailored for any given system configuration which can reduce the need for excess hardware system resources. All of these factors improve the system scaling.

Thus the subject invention avoids the complex and expensive changes required of the controller chips in prior shared-memory systems to increase the number of processors and size of memory that they can support.

As previously stated herein, a feature of this invention is its elimination of the conventional memory controller chipset, which is typically a set of distinct components sometimes with an integrated nodal directory and nodal cache. As a practical matter, it is difficult and expensive to manufacture such a directory/cache/controller combined arrangement, because the combined chip requires an excessive number of I/Os connections which limit scaling by this chip to the maximum number of processors which can be connected. The subject invention allows for better cost performance at high levels of multiprocessing, because of the fact that the number of I/O pins on the prior art combined chip cannot be made cost effectively high enough to connect to all the needed DRAM cards.

Hence, effective memory access bandwidth is greatly increased by the subject invention over prior systems without requiring any increase in hardware bus speed. This is because the subject invention splits its memory controller function into independent memory controller sections, each controller section located on a separate processor chip connecting to a separate shared-memory DRAM section. The sectionalized memory/controller/processor structure provided by the subject invention avoids memory bus contention by eliminating contention on the common memory bus used by conventional memory controllers, which causes interference among concurrent memory accesses and serializes memory accesses among plural contending processors. This invention allows parallel and independent accessing of shared memory without causing the contention to avoid the prior serialization of concurrent memory requests by having the concurrent requests performed on different memory buses using different memory controllers. Thus this invention significantly reduces contention among the plural processors for accessing memory An I/O controller is provided on each processor chip which provides I/O interface for each processor and its connected DRAMs. The I/O controller on each processor chip connects to an external I/O bus, which eliminates a conventional I/O controller chip found in many existing multiprocessor systems, and improves system scaling by increasing the I/O connectivity of the system as the size of the system is increased. This I/O interface has the potential additional efficiency advantage of enabling I/O data to flow directly to assigned locations on the DRAMs connected to its processor chip (under control of the operating system assigning a preferred page frame to the I/O data transfer), which can provide an I/O data path without contention with any other data path in the system. Another data path which may be used internal to a node is to transfer I/O data through each processor on a processor chip to the nodal cache in the node. This type of transfer of I/O data may be controlled by the processor sending a command (addr/cmd) on a command bus connecting each processor chip to its nodal directory chip; the command includes a requested memory address and authority for the access to its Nodal cache function which are handled by the Nodal directory. Intra-node busses may also be used as necessary to transfer I/O data.

BRIEF DESCRIPTION OF THE DRAWINGS

The foregoing and other objects, features and advantages of the invention will be apparent from the following detailed description taken in conjunction with the accompanying drawings in which.

Figure 1:
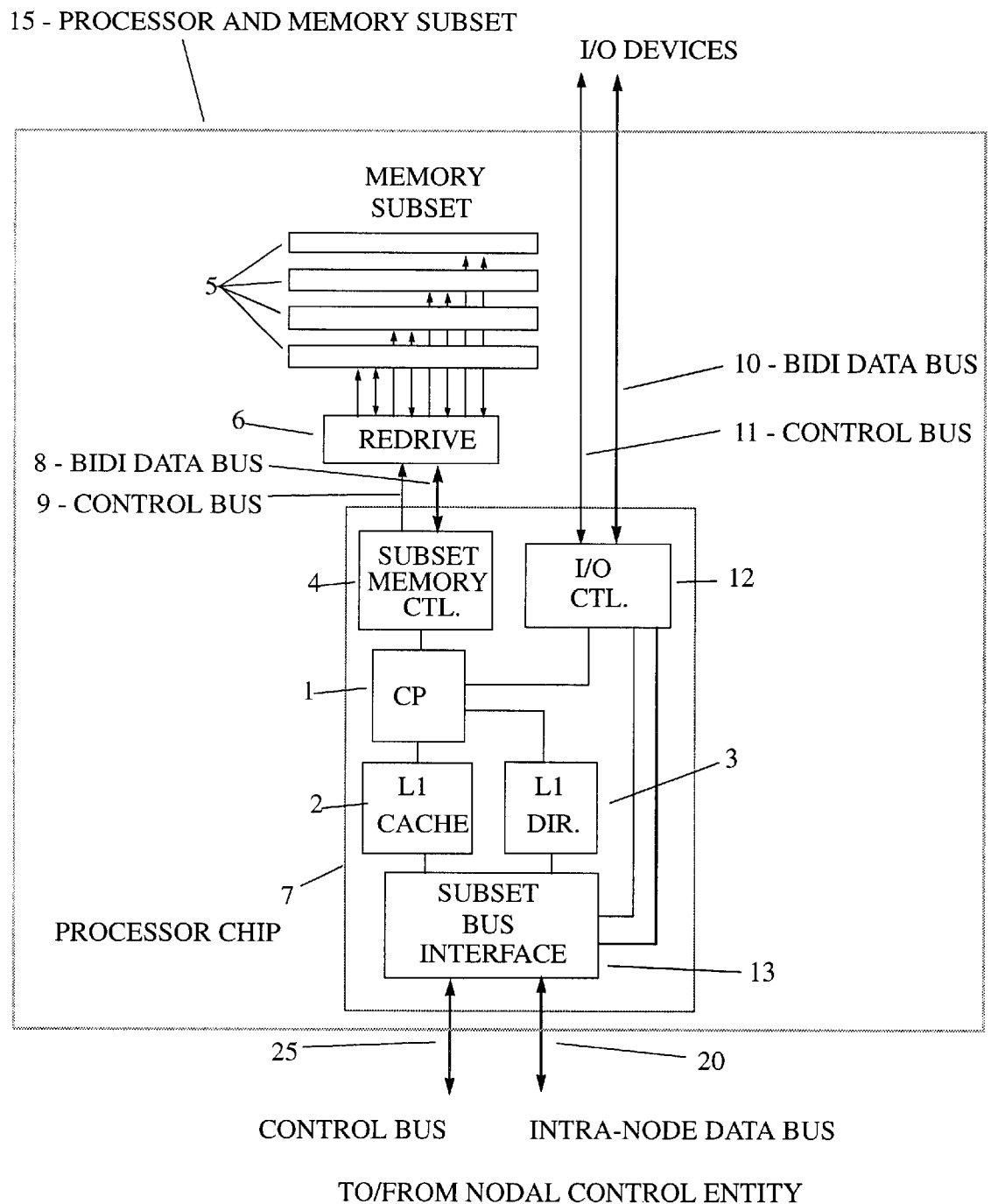
FIG. 1 represents a configuration of a processor chip 7 which is part of the processor function which may be replicated in each node of a system. Processor chip 7 includes a central processor (CP) 1 comprised of processor circuit logic integrated with an L1 cache 2, an associated L1 directory 3, a memory controller section 4, and an Input/Output (I/O) controller 12, which provides an I/O interface for connecting CP to I/O devices. Memory controller section 4 includes a memory interface connectable to a set of random access electronic memory chips, such as DRAMS on SIMS (single in-line memory modules) 5. An optional standard redrive chip 6 is shown between processor chip 7 and SIMs 5 to redrive the signals for higher performance. A bus interface unit 13 supports the bussing between the processor chip 7 and the common switch/cache (41 on FIG. 2).

Each switch/cache chip 28 contains an electronic switch portion 22 and and nodal cache portion 21. All of the electronic section switches 22 and nodal cache sections 21 are integrated together in the node by connection to an nodal control chip 27 containing an nodal directory 24 and an nodal-cache-and-crossbar-switch control 23. The electronic switch 22 transfers data to/from the processor chips 7 over the bidirectional data busses 20. The electronic switch 22 also transfers data to/from other nodes over the inter-node data busses 32. Note that the inter-node addr/cmd and data busses are combined into a single entity 31 to simplify following figures.

Figure 3:
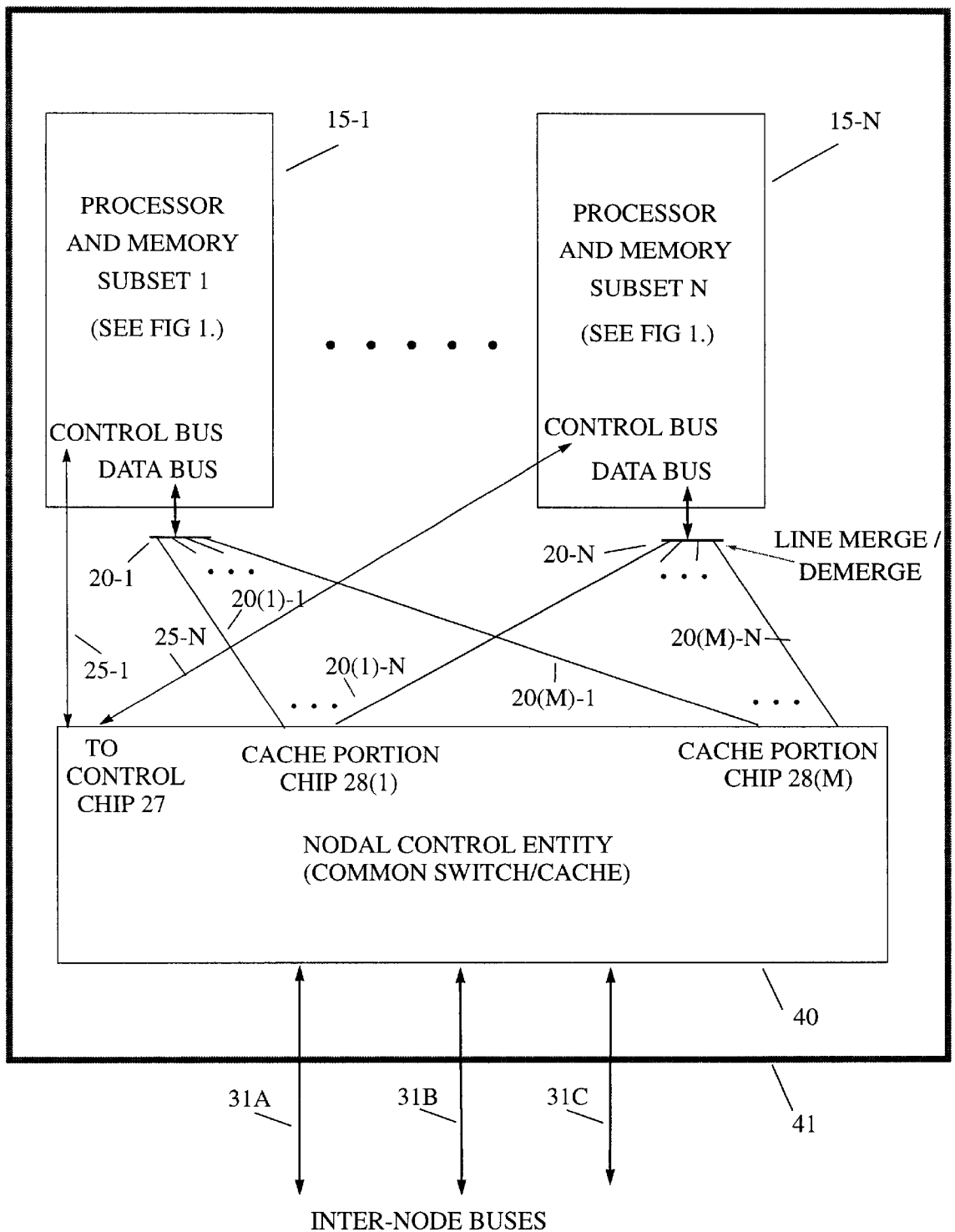

FIG. 3 illustrates a node containing "N" of the processor chips and memory combinations 15 shown in FIG. 1, in which a bus interface unit 13 is connected to a bidirectional intra-node data bus 20 which connects to one end of a set of bidirectional buses of which each bus has its other end connected to a different nodal section chip 28, through an electronic section switch 22. Any CP 7 in the node can access an operand in any nodal cache section of the node, while the nodal cache directory of the node maintains data coherence and data integrity for all memory accesses by all of the CPs in the system which may access data in the shared memory section connected to any processor chip 7 of that node.

Figure 2:
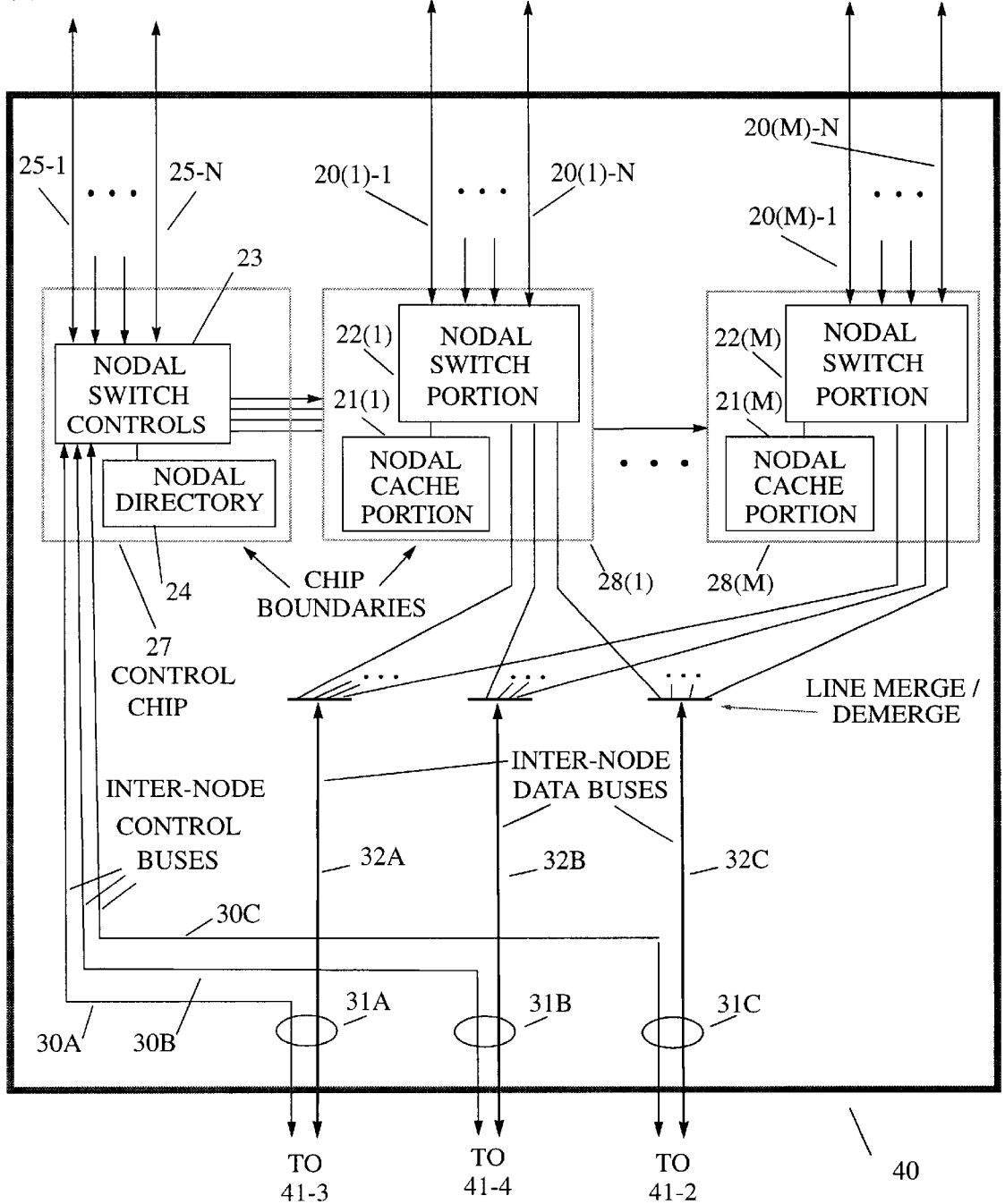
FIG. 2 illustrates the common switch/cache consisting of a control chip 27 and "M" switch/cache chips 28. The control chip 27 contains the controls for the cache and switch 23, and the nodal directory 24. The controls 23 are responsible for operation of the nodal cache and the electronic switch for servicing various requests for these resources. They are also responsible for maintaining data coherence and data integrity for all memory accesses by all of the CPs in the system which may access data in the shared memory section connected to any processor chip 7 of that node. The control chip 27 communicates with the processor chips 7 through the addr/cmd busses 25, and with the control chips on other nodes through the inter-node addr/cmd busses 30.
Figure 4:
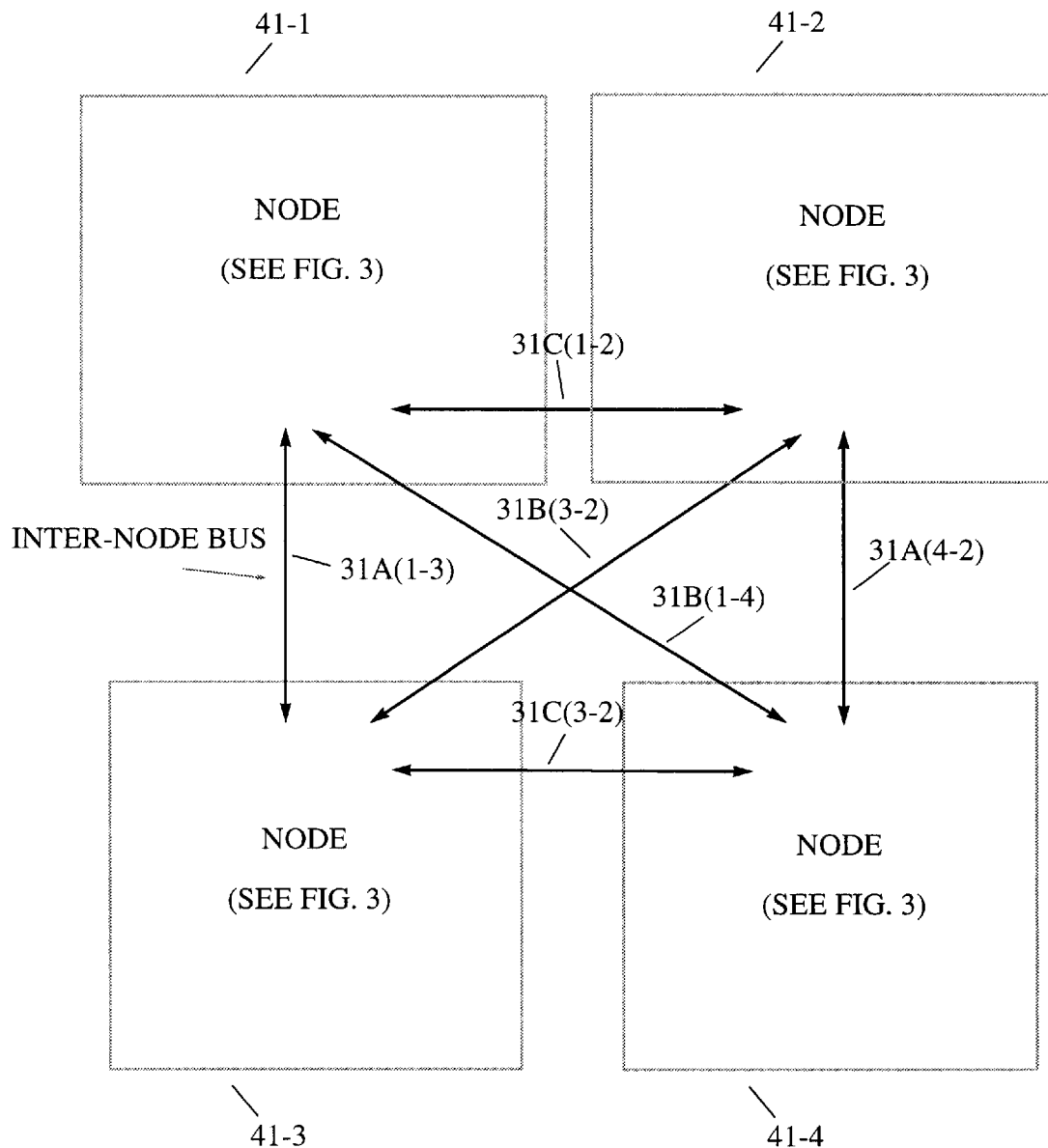

FIG. 4 illustrates a computer entity having four nodes, in which each node is made as shown for the node in FIG. 3 to provide a computer entity having a configuration of 4×N CPs and 4 nodal caches. In FIG. 4 the nodes are connected together by internodal buses 31, each comprising the address/control 30 and data bus 32 as shown in FIG. 2. Each end of each bus 31 connects to one node in the computer entity in FIG. 3. The I/O interfaces 12 and their bus portions 10 and 11 (shown in FIG. 1) are included in each processor chip 7 in FIG. 3 in which they are not shown to avoid line confusion in the drawing.

Figure 5:
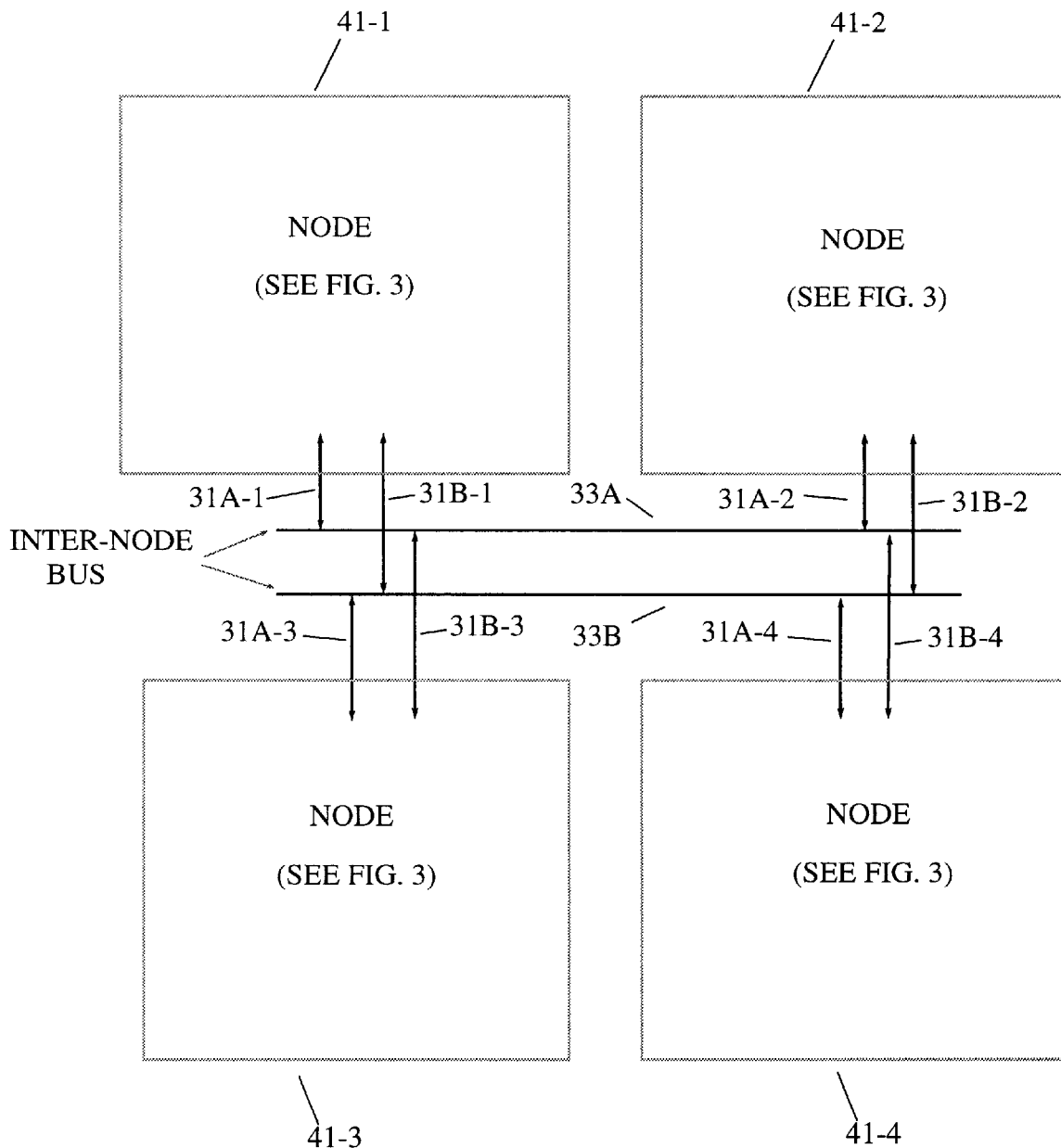

FIG. 5 illustrates an alternative method of inter-node busing for interconnecting a four node computer entity (having the same 16 processors shown in FIG. 4). FIG. 5 has uses a different type of inter-node bus, which is a shared multidrop bus 33. Each multidrop bus 33 contains a data bus portion and an address/control bus portion similar to the inter-node busses 31 attached to each node. Although a single shared multidrop bus 31 can be used, the drawing illustrates 2 such busses to provide greater total bandwidth. Requests will be divided between the busses based on the physical address being requested.

Figure 6:
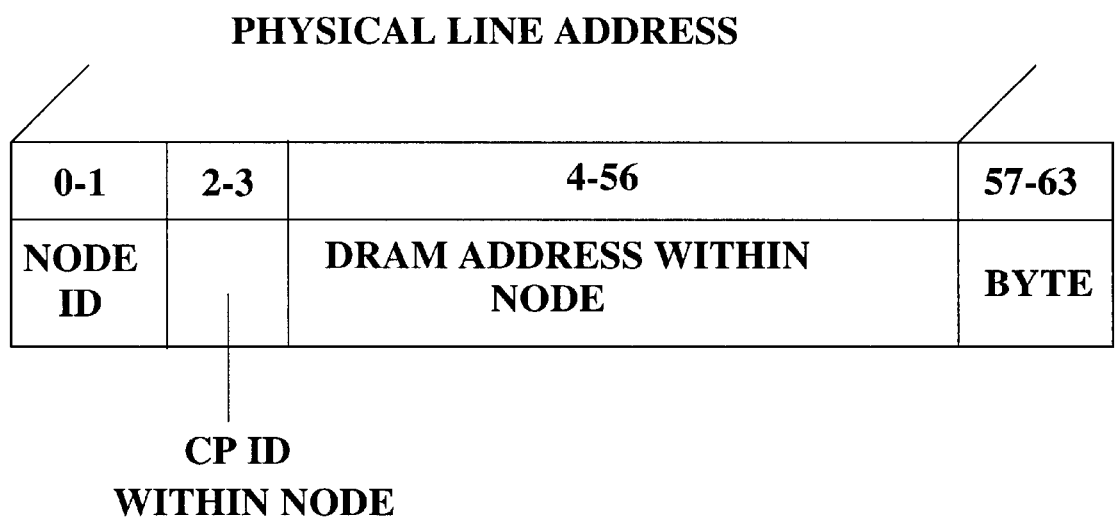

FIG. 6 illustrates the physical address used to uniquely identify a line system wide. This physical address consists of the node and CP ID of the DRAMs that own that data, as well as the byte address of the data within that DRAM section. The physical line address consists of bits 0–56 of the physical address, with bits 57–63 used to specify the bytes within a line. This example assumes a 128 byte line size.

FIG. 7 illustrates the contents of L1 directory 3 and nodal directory 24 entries.

The L1 cache 2 is managed as store-in. The L1 directory 3 marks lines as exclusive or shared in accordance with standard MESI cache coherency protocol. Exclusive lines may contain modified data, and are marked as modified when they do so. The address portion of the directory contains the necessary information to identify the system wide unique line address of the data. This typically includes the node and CP ID of the DRAMs that own that line, as well as the line address of the data within that DRAM section.

The nodal cache 21 is also managed as store-in. The nodal directory 24 marks lines as exclusive or shared in accordance with standard MESI cache coherency protocol. When a line is marked as exclusive, the Excl-CP-ID bits indicate which processor 7 had requested exclusive ownership of the line. If the line is marked as shared, the Excl-CP-ID bits have no meaning. Exclusive lines may contain modified data, and are marked as modified when they do so. The address portion of the directory contains the necessary information to identify the system wide unique line address of the data. This typically includes the node and CP ID of the DRAMs that own that line, as well as the line address of the data within that DRAM section.

DETAILED DESCRIPTION OF PREFERRED EMBODIMENT

FIG. 1 illustrates a basic building block in the preferred embodiment; it is a uniprocessor configuration which includes a memory 5 and a semiconductor chip 7. Chip 7 contains a CP (central processor 1, an L1 cache 2, an L1 directory 3, a memory controller 4, and an I/O interface 12 to I/O devices. In chip 7, the L1 cache 2 is the private cache of CP 1, and the L1 directory 3 is the directory for cache 2. The memory controller 4 is the interface between memory 5 and CP 1. The I/O interface 12 is connectable to I/O devices which may be external of the computer system containing CP 1. A bus interface unit 13 supports the bussing between the processor chip 7 and the common switch/cache (40 on FIG. 2). This serves as a basic building block for all larger configurations.

Memory controller 4 includes the control logic required for the operation of memory 5, which is the main storage for CP 1 and is comprised of DRAM devices. Conventional controls in controller 4 consist of combinatorial logic and latches which provide the signals needed to drive a set of industry standard DRAMs. The signals produced include Row Address Strobe (RAS), Column Address Strobe (CAS), Address, Chip Select (CS), Output Enable (OE), Data Out among others. The sequence of operation for these control signals is of conventional design and is well known in the industry. The control logic also produces the required DRAM refresh signals in accordance to the DRAM product specification. The logic is also responsible for maintaining status for all outstanding main storage requests and for the detection and possible correction of data parity or ECC errors. The memory controller also supports the ability to cancel or discard returning data from memory fetches after they have been initiated. The SIMMs/DRAMs in memory 5 may consist of multiple banks of DRAM chips to provide a required total size for the DRAM array.

The combination of a memory controller 4, bidirectional data bus 8, and the address/command bus 9 is referred to as a "memory interface".

Each I/O interface 12 includes conventional control logic required for the CP to interface the operation of a collection of I/O devices. The control logic consists of combinatorial logic and latches which provide the signals needed to drive either an industry standard I/O bus (such as PCMCIA) or a proprietary I/O interface to an I/O device controller. The logic function consists of bus arbitration, command formatting, interrupt handling logic circuits, among others.

With very high level circuit density on a chip, multiple processors 1, and/or an additional level of cache, may be provided on the same chip 7. In such case, an option for multiple CPs 1 on the same chip 7 is to share one or more levels of cache, and/or share the interfaces to memory and/or I/O.

Memory 5 may be conventionally implemented as DRAM chips mounted on SIMs (Single in-line modules) 5 or DIMs (Dual in-line modules). Optional standard redrive chips 6 may be added between the processor chip 7 and the SIMs 5 (or DIMs) if needed for higher speed performance.

FIG. 2 illustrates the common switch/cache consisting of a control chip 27 and "M" switch/cache chips 28. The control chip 27 contains the controls for the nodal cache and switch 23, and the nodal directory 24. The controls 23 are responsible for operation of the nodal cache and the electronic switch for sequencing various requests for these resources. They are also responsible for maintaining data coherence and data integrity for all memory accesses by all of the CPs in the system which may access data in the shared memory section connected to any processor chip 7 of that node. The control chip 27 communicates with the processor chips 7 through the addr/cmd busses 25, and with the control chips on other nodes through the inter-node addr/cmd busses 30.

Each switch/cache chip 28 contains an electronic switch portion 22 and nodal cache portion 21. The electronic switch 22 transfers data to/from the processor chips 7 over the bidirectional data busses 20. In the preferred embodiment there are four switch/cache chips 28. Data is transferred between any processor chip 7 and the four switch/cache chips 28 by being bit-sliced (four bytes per chip 28 from a 16 byte data bus 20), so that the four identical switch/cache chips 28 transfer 16 bytes in parallel to/from each processor chip 7. Thus each cache portion 21 is shared by all processor chips 7 in the node configuration.

The electronic switch 22 also transfers data to/from other nodes over the inter-node data busses 32. Note that the inter-node addr/cmd and data busses are combined into a single entity 31 to simplify following figures.

FIG. 3 illustrates a preferred embodiment of a single node computer entity which includes multiple processor chips 7 of the same type as shown in FIG. 1. Here, "N" processor chips plus memory building blocks 15 are interconnected by bidirectional buses 20 to the common switch/cache block 40, which consists of "M" switch/cache chips 28 and a control chip 27. In the preferred embodiment, N=4 and M=4, and we will use these values in the following discussion.

Further, this node connects to other nodes through three bidirectional inter-node bus ports 31. The other end of the busses 31 connects to corresponding crossbar switches 22 in another node (to be discussed later). Additional buffers may be provided on each bus for speed matching the buses ,or for temporarily buffering store data if desired, though they are not included in the figures.

The nodal control chip 27 also includes nodal directory 24 connecting to the Nodal cache (provided by the four nodal cache portions 28). Also the nodal control chip 27 includes logic circuits 23 connecting to each of the nodal chips 24 to control the transfer of 16 byte data units between the nodal cache portions 28 and either a selected local processor chip 7 or a selected remote node.

The nodal directory 24 includes high speed SRAM technology with operating with at least four independently accessible interleaves. Such implementation of the nodal directory 24 provides high bandwidth needed for processing a coherence protocol, as well as cache fetch and store requests. Set-associative congruence class entries may be provided in each of the nodal directories 24 for use in determining hits and misses in each directory.

Any of a variety of cache coherent protocols may be used in this single or multiple node computer structure. In the preferred embodiment, the nodal directory 24 is "inclusive", which means that all entries in any L1 directory 3 (which are directly available to the CP on the same processor chip 7) are also contained in the nodal directory 24 which is connected to the respective L1 directories on chips 7. Coherence consistency among the cache lines is maintained using the standard MESI protocol or a variation of it (for details see U.S. Pat. No. 5,265,232 by Gannon et al on Cross-Invalidate Directory Methods and Means). Each nodal directory 24 contains information on the status of the data lines stored in its associated nodal cache as described in FIG. 7 This data is used to implement data consistency over the entire nodal computer system.

A search of nodal directory 24 provides the necessary data on the status of that line within the node configuration of four processors to maintain data coherency in the single node system. If the line is marked exclusive in the nodal directory 24, then nodal directory Excl-CP-ID bits indicate the ID of the CP holding the line exclusive (see FIG. 7 for a list of bits in each directory entry). If the line is marked shared, then in the preferred implementation it is assumed that any of the processors 7 on that node could contain a copy of the line in their L1 caches 2 in a shared state. With additional bits in the nodal directory for each line, and added control complexity, it is also possible to indicate which (if any) of the L1 caches 2 are actually holding a copy of the line in a shared stated.

Nodal directory information is used to initiate any needed cross-interrogate request of the type described in U.S. Pat. No. 5,265,232 by Gannon et al. The control logic 23 on the control chip 27 includes the ability to receive and buffer requests from the multiple sources (including other nodes—to be discussed later), or to chose a request for nodal access using a priority mechanism, and to ensure that no new request operation is started if it conflicts with a previous request operation currently underway (due to a conflict of addresses or resources needed).

The control logic 23 also includes conventional means to control the nodal cache 21, including using nodal directory 24 information (hit, miss, exclusive, modified, invalid, etc. . . ) to determine the status of a cache line stored in each nodal cache entry. The control logic 23 also controls the operation of the crossbar switch 22 to transfer data between the various inter-node ports.

The intra-node bussing includes a data bus 20 connected between each processor chip 7 at one end, and to one of the switch/cache portions 28. The intra-node bussing also includes an addr/cmd busses 25 also connected between each processor chip 7 at one end and to the nodal control chip 27. The addr/cmd bus 25 carries addresses and control information for fetch, store, and cross-interrogate operations, tags to distinguish between the operation types, and responses from cross-interrogates or other directory searches. The preferred embodiment's intra-node L1/nodal bus 25 is unique to each L1 cache 2. If instead, the intra-node buses are multi-drop shared buses (instead of each L1 cache unique buses 14 , all L1 directories 3 would need to snoop all bus activity using conventional "snoopy" protocols well know in the industry which may have less efficiency of operation.

Additional levels of processor and/or cache integrated into each processor chip 7 may be done with future more advanced CMOS manufacturing techniques, which may combine some of the functions of the cross-bar switch 22, the nodal cache 21, then nodal controls 23, or the nodal directory 24 within each processor chip 7 in the future.

Accordingly, the overall CP memory in a node is comprised of all memory portions 5 which are partitions of a nodal memory in the preferred embodiment in which each memory 5 is assigned a unique physical address range to provide a nodal memory assigned the sum of the address ranges assigned to the respective memories 5 in the node. Further in a multi-nodal computer system made according to this invention, each node may either have a unique address range, or each node may be assigned a unique identifier when each of the nodes uses the same or overlapping address ranges (which is the preferred embodiment). The sum of the address ranges in all nodes in a system comprise the overall set of addresses of the computer system.

Each memory access can be classified as one of three types: a shared request which typically are instruction fetches, and exclusive request which is typically a data store or locking operation, and a conditionally exclusive request (i.e. cond-excl) for most data fetches. When a requested fetch misses in its processor's L1 directory 3 and fetches the line from elsewhere in the system, a shared request will always return the line in a shared state, an exclusive request will always return the line in an exclusive state, and a cond-excl request will return the line in an exclusive state if it is not being cached by any other processor in they system otherwise it will return it as shared.

When a requested fetch misses in its processor's L1 directory 3, the fetch is issued by the processor chip 7 to the local node's nodal controls 23 using that processor's addr/cmd bus 25. The nodal controls 23 search the nodal directory 24 for the address of that particular line. If the line is present and valid in the nodal directory 24, the following sequence of events occur. If the nodal directory 24 finds the data marked as exclusive and the Excl-CP-ID bits in the directory entry do not match the requesting CP, the nodal controls 23 then signal the L1 cache designated in the Excl-CP-ID bits using the addr/cmd bus 25 to transfer a copy of the modified data to nodal using the data bus 20. The nodal controls 23 also signal the L1 caches on that node to change the sate of that line in the L1 directories 3 to invalid (if the data is to be returned as exclusive) or shared (if the data is to be returned as shared). If the state of the line in the nodal directory 24 was shared and the data will be returned as exclusive, then all L1 directories 3 on that node must be signaled to invalidate the line because the nodal directory 24 does not maintain a list of all the locations for shared copies of that line to save some directory space. That data is then supplied by the nodal cache to the requesting processor chip 7, and the data transfer is made through the associated crossbar switch 22 using its connected data bus 20. In all cases, the shared/exclusive state is appropriately marked in the nodal directory 24, and the Excl-CP-ID bits in the nodal directory 24 which identify the CP requesting the line are set to the proper CP ID value.

When a requested fetch that misses in its processor's L1 directory 3 is for data from the DRAM section 5 locally attached to the requesting processor chip 7, the memory controller 4 can immediately initiate a fetch operation to locally attached memory location in parallel with sending the request to nodal. Such a fetch would be later canceled if the line was found present in that node's nodal directory 24, or modified in any other cache in the system. This enables low latency high bandwidth access to the locally attached memory for programming applications that can be tuned to utilize this feature.

An alternative approach to the memory interleave scheme above is to use an interleave size smaller than a cache line, so that a cache line spans across multiple memory interfaces. The line could then be fetched and forwarded to the nodal cache 21 employing multiple memory interfaces and data busses 20 in parallel. This provides higher bandwidth performance for individual fetches.

When data is found in the nodal directory 24 marked as held exclusive by another processor (the Excl-CP-ID bits do not match the requesting CP) but not modified, it may be possible to fetch a valid copy of the data directly from nodal cache 21 without copying the data from the L1 2 cache back into the nodal cache 21 first. In the preferred embodiment however, such a fetch from the L1 cache 2 to the nodal cache 21 nevertheless is done to avoid problems with potentially missing stores done late in a sequence of operations.

If the requested line is not found present and valid in the nodal directory 24 for that node, and if the requested data is not in the DRAMs 5 locally attached to the requesting processor chip 7, and if no other nodes are present in the system, then a fetch command is sent across the appropriate addr/cmd bus 25 to the appropriate memory controller 4 on that node to initiate a memory access. When data is returned from the memory DRAMs 5, it is transferred across a data bus 20 to the switch/cache chips 28. There, under the direction of the control chip 27, the data is loaded into the nodal cache 21, the nodal directory 24 is updated, and the data is forwarded to the requesting processor via the electronic switch 22 and the appropriate data bus 20. If there are other nodes present in the system they must be interrogated—a detailed discussion of that operation will be given later.

FIG. 4 illustrates the preferred way to interconnect four nodes 41 together into a large cache coherent multiprocessor computer configuration. Note that the multi-node configuration in FIG. 4 is constructed with the same chip types used to construct the single node computer structure of FIG. 3 without using any additional chip type, and that the memory and I/O portions 5 and 12 scale in proportion to the number of processors added in all nodes. The four nodes 41 are interconnected in FIG. 4 by bidirectional buses 31 interconnecting the nodes. Each bus 31 includes a 16 byte data bus 32 and an "addr/cmd" bus 30 which carries addresses for fetch, store, and cross interrogate operations, in which command tags specify the operation types, and responses are provided from the nodes receiving cross interrogates or other directory search commands.

Memory 5 in the nodes is partitioned among the memory interfaces in chips 7 based on assigned main storage address ranges, and is globally addressable by all processors in the system. I/O address range(s), are assigned to not overlap the main storage address range, in or all of the processor chips 7, and through these I/O ranges all I/O devices can be accessed by all processors in the system.

Each node 41 in FIG. 4 contains an nodal directory 24 which is inclusive of all lines cached in the L1 caches 2 of the CPs 1 in the same node. However, the L1 and nodal caches in any node can access and cache data fetched from the memory 5 in any of the nodes in the computer system. A cache line can simultaneously exist in multiple nodal directories 24 in a shared (read-only) state. A line can only exist in a single Nodal directory 24 in an exclusive or modified state, in accordance with the conventional MESI protocol.

In the multi-node computer system of FIG. 4, any node containing a CP initiating a memory request is referred to as the requesting node. The node 41 containing the memory 5 having the data to be accessed is referred to as the home node of that request, and is responsible for maintaining coherency for that data. A node 41 currently caching the line in an exclusive state is referred to as the holding node for that data.

When the state of a data line is changed in any of the multiple nodal directories 24, a "serialization process" is used in the operation to ensure that two simultaneous requests do not conflict with each other, in order to maintain a consistent view of data in the computer system's storage as observed by all of its CPs 1 in all of its nodes. Typically this is done whenever one or more copies of a line must be invalidated when one processor needs exclusive access, such as to write in a data line. Another such situation occurs when a line must be changed from exclusive to shared to allow multiple processors shared access to that line and use multiple copies of the line in shared state. The "serialization process" is accomplished by sending all such requests to the home node for a requested address. The nodal control logic 23 in the home node 41 then processes each such request in a defined order based on a priority mechanism implemented in each node.

When a fetch misses the nodal directory 24 and the requesting node is the home node, the nodal controls 23 will immediately initiate a fetch operation to that memory location as was described for FIG. 3. Simultaneously, the nodal controls 23 broadcasts the address of the fetch command across the inter-node addr/cmd busses 30 to the nodal controls 23 on the other nodes. Each of the nodal controls 23 will search for this address in their nodal directory 24, and respond with its status back to the requesting node's nodal controls 23 using the inter-node addr/cmd bus 30. Because of the direct node interconnection scheme used, this operation is much faster than the memory access. If one of the other nodal controls 23 responds that the line is in an exclusive state in its nodal directory 24, the nodal control 23 on the requesting node sends a signal across the appropriate addr/cmd bus 20 to cancel the memory request, and the line is fetched from the holding nodal cache 21 to the requesting nodal cache 21 using the electronic switches 22 and an inter-node data bus 30. Because all nodal directories 24 are inclusive, any data in an exclusive or modified state in an L1 directory 3 will have that information reflected in its nodal directory 24. In such a case, the data is fetched from the actual copy in the L1 cache 2 using methods described for FIG. 3 before being delivered to the requesting node. If the original request type was exclusive, the requested data is returned in an exclusive state, and any other nodal directory 24 or L1 directory 3 originally holding that line must change its state to invalid. If the original request type was shared or cond-excl, the requested data is returned in a shared state if it has been found to be already cached elsewhere in the system, and any other nodal directory 24 or L1 directory 3 holing the data in an exclusive or modified state must change its state to shared. If a modified cache line is changed to a shared state for the purposes of being shared across multiple nodal directories 24, it is typically stored back to the home memory 5 as part of the operation (thus avoiding the need for a "modified-shared" state). If the data is not found to be exclusive or modified in any other directory (3 or 24), the original memory request is allowed to complete and provide the data as described for FIG. 3. The final state of the returned line (excl or shared) is a function of the request type and whether the line was found present in any other cache in the system as described for FIG. 3.

When a fetch misses in the nodal directory 24 and the requesting node is not the home node, the nodal controls 23 send the request to the nodal controls 23 on the home node for processing using the appropriate inter-node addr/cmd bus 30. When chosen for processing by the priority mechanism in the nodal controls 23 of the home node, the Nodal controls 23 search its nodal directory 24 to see if the line is present. If a hit is detected, the line is returned from the nodal cache 21 from the home node to the nodal cache 21 of the requesting node using the electronic switches 22 and the appropriate inter-node data bus 32, and any needed changes to cache states are broadcasted by the home node to the nodal controls 23 on all appropriate nodes using the inter-node addr/cmd buses 30. If the nodal directory 24 indicated that the line was in an exclusive state, the line is first fetched from the L1 cache 1 indicated by the Excl-CP-ID bits using methods described for FIG. 3 before being forwarded to the nodal cache 21 of the requesting node. If the line was not in the nodal directory 24, a memory fetch is issued by the nodal controls 23 to the appropriate memory controller 4 in the home node using the appropriate add/cmd bus 25.

In parallel with the memory fetch on the home node, the home node's nodal controls 23 broadcast the requested address of the fetch command to the nodal controls 23 on all other nodes (except the requesting node) using the inter-node addr/cmd busses 30. The nodal controls 23 on the other nodes search their nodal directories 24 to see if they are holding the line in an exclusive or shared state. If they are holding the line in an exclusive state, the line is fetched from that nodal cache 21 to the home node using methods described previously on the appropriate electronic switches 22 and the inter-node data bus 32. The home node forwards the line to the requesting node using the appropriate inter-node data bus 32.

If no other nodal directory 24 is holding the line in an exclusive state, the memory fetch is allowed to complete on the home node, and the data line is forwarded across the appropriate intra-node data bus 20 to the home node electronic switch 21, and then forwarded to the requesting node across the appropriate inter-node data bus 32.

If the original request type was exclusive, the requested data is returned in an exclusive state. If the original request type was cond-excl and the data was not found present in any other cache in the system, the requested data is returned in an exclusive state. For other cases, the requested data is returned in a shared state.

If the data is being returned to the requesting processor in an exclusive state, the home node's nodal controls 23 issue on the addr/cmd busses 25 an invalidate command for the requested data to the other nodes as appropriate. If the requested data is returned in a shared state, any other nodal directory 24, and any L1 directory 3, holding the data in an exclusive or modified state changes its state to shared. Additionally, a shared copy of the line may be placed in the nodal cache 21 of the home node.

If a modified cache line is changed to a shared state for the purposes of being shared across multiple nodal directory 24, it is typically stored back to the home memory 5 as part of the operation.

A store into a line currently in a shared state in an L1 directory 3 is treated as a cache miss, and a fetch command requesting exclusive ownership of the requested data line is sent to the nodal controls 23 using an addr/cmd bus 25. For improved performance, this can optionally be treated as a special request that returns exclusive ownership without returning data, using methods known in the industry (see U.S. Pat. No. 5,265,232 by Gannon et al. for example).

The address range corresponding to I/O devices, which does not overlap the main storage address range, is partitioned across some or all of the processor chips 7. All I/O devices are addressable by all processors in the system. Commands to the I/O devices from processors 7 can be sent directly to the I/O devices on the I/O addr/cmd bus 11 (FIG. 1) for locally attached I/O devices. Commands for other I/O devices are routed through the intra-node addr/cmd busses 25, the inter-node addr/cmd busses 30, and the control chips 27 to the proper I/O control port 12. DMA commands from I/O devices are also routed over the addr/cmd busses 25 and 30 and control chips 27. Likewise data transfers to/from I/O devices are routed to the appropriate I/O control 12 using the intra and inter-node data busses 20 and 32, as well as the switch portions 22 in a fashion similar to the memory operations. I/O operation can access data in caches, but they do not cause new data to be brought into caches.

ALTERNATIVE INTERCONNECTION OF MULTIPLE NODES (FIG. 5)

FIG. 5 illustrates an alternative interconnect scheme for a four node computer system using shared multi-dropped data and addr/cmd buses 33 connected to the node busses 32, using an arbitration technique well known in the industry. These replace the direct point-to-point connections provided by the node busses 31 in FIG. 4. The four nodes 41 in FIG. 5 are structured identically to the four nodes 41 in FIG. 4, but the nodes are connected by different type of inter-node buses 33 which are the multi-drop type. Although a single multi-drop bus could have been used to implement the system in FIG. 5, two busses are shown in FIG. 5, operating inter-leaved based on address range for improved bandwidth. The sequence of operations described above for FIG. 4 can be used for the configuration in FIG. 4, although the FIG. 4 implementation has the potential for simplifying and combining snoop broadcasts for inter-node fetches.

Because of the serialization mechanism implemented by the method described for FIG. 4, all nodal miss operations involve processing the command in the control chip 27 of the home node for the requested address. This arrangement lends itself well to implementing a directory table, managed by the control chip 27, for all address from a given node that are currently in use on another node. Such a directory table could be used to avoid doing unnecessary cross interrogate searches between nodes.

The word "node" is noted to have many diverse and unrelated meanings in the prior art. A common use in the prior art found for the word "node" is in communication networks, in which a network comprises multiple independent "nodes" connected by communication links that transmit packets of data between the "nodes", and each node is an independent hardware computer system having its own independent operating system, wherein each "node" may be what is often called a "central electronic complex" or a "central processing complex". A different meaning for the word "node" is commonly found in the software prior art, in which "node" is often used to represent a software construct containing one or more address pointers for locating one or more other nodes in a multi-nodal software arrangement. And, there are other meanings in the prior art for the term "node". It therefore is important to recognize that the word "node" should only have the meaning indicated within the specification in which it is being used. For these reasons, great care is required in trying to transfer a meaning of the term "node" from a prior art document to the subject specification.

In this specification, the word "node" represents a section of a single computer system, which is comprised on one or more "nodes" (i.e. one or more sections) connected by "inter-nodal" (i.e. inter-sectional) buses. If initially comprised of a single section, one or more additional sections may be added later and connected by inter-sectional buses to the initial section for expanding the capacity of the computer system. Adding additional sections ("nodes") does not change the single computer system characteristic in which all "nodes" (i.e. sections) are capable of being managed by a single operating system. That is, in the subject specification, each "node" in a plural node system is one of the "sections" within a single computer system. Within this single computer system, each of the plural "sections" is comprised of a plurality of "system cells", in which each cell is comprised of a processor chip and a local memory (e.g. DRAMs) connected to the chip by a local bus. Each processor chip contains at least one central processor and may contain multiple central processors. All or some of the system cells in any section of the computer system may or may not contain an I/O interface. If a cell contains an I/O interface, it may be supported by providing an I/O processor on the chip, or by having a central processor on the chip perform the I/O function to provide an I/O interface (in addition to its central processing functions).

Having thus described our invention, what we claim as new and desire to secure by Letters Patent is:

1. A scaleable computer system constructed of replicatable semiconductor chips in one or more nodes, in which the size of any node and/or the number of nodes in the system can be easily varied to change the size and performance of the computer system, each node in the computer system comprising:

a plurality of processor semiconductor chips (processor chips) within each node, each processor chip containing at least one central processor having a private cache (L1 cache) and a memory controller in each processor chip, the processor chips each having the same manufacturing specification to support easy replicatability, a plurality of RAM (random access memory) semiconductor chips (RAMs) forming a shared memory in the computer system accessible to all central processors on all processor chips in the computer system, the shared memory being comprised of the totality of RAMs in the computer system, the shared memory being separated into a plurality of subsets of the RAMs (RAM sections), each RAM section being connected to a memory controller on a different processor chip in the computer system, a plurality of local memory buses, each memory bus being locally connected between a respective RAM section and a respective memory controller on a respective processor chip for direct access between a locally connected RAM section for each processor on the respective processor chip, a nodal cache in each node, each nodal cache being connected to each processor chip in the same node for storing data accessed in the shared memory by any central processor in the same node, a nodal directory in each node connected to the nodal cache in the same node, each nodal directory connected to each processor chip in the same node, and intra-nodal busing in each node for connecting each processor chip to the nodal cache and nodal directory in the same node to enable any processor in the node to access data on any RAM section of the shared memory of the node when any processor is accessing a RAM section not directly connected to the processor chip containing the processor, and one or more replicatable nodal cache semiconductor chips (nodal cache chips) form the nodal cache of each node used for storing data accessed by the central processors in the node or stored in the RAM, and each replicatable nodal cache semiconductor chip of the nodal cache is connected to the nodal directory of the same node, the nodal directory locating processor-requested data in the nodal cache, and an intra-nodal electronic switch connects the nodal directory and each nodal cache chip to each processor chip in the same node and enables data being stored in the RAM section connected to each processor chip being quickly accessible to and usable by any processor on the processor chip overlapping with an access to the nodal cache or nodal directory for determining if a changed copy of the data exists anywhere in the system, and wherein controls in each processor chip for requesting data from the connected nodal cache with a processor-requested address of the data to the connected nodal directory control fetching of the data from the connected nodal cache when the data is not available as short-path data in the RAMs connected to the requesting processor chip, and nodal controls of the nodal directory fetch data from the connected nodal cache when the data is currently contained in the connected nodal cache, and nodal miss controls of the nodal directory respond when the data is not contained in the connected nodal cache with a nodal request for the data to a processor chip connected to a RAM section having the processor requested address, and the nodal-requested processor chip sends a copy of data at the requested address to the nodal cache, which data is then sent by the nodal cache to the processor providing the processor requested address which had missed in the nodal cache and further comprising
a plurality of identical nodal cache chips comprising the nodal cache, in which each nodal cache chip stores a fraction of each line of data (each data line) stored in the nodal cache, each data line being a unit of data determined by a single access in the shared memory.

2. A scaleable computer system constructed of replicatable semiconductor chips in one or more nodes, as defined in claim 1, wherein
said intra-nodal electronic switch for the nodal directory connects the nodal directory to each processor chip in the same node for controlling a data transfer requested by any processor in the computer system of data stored in any local RAM section RAM in the node containing the nodal directory.

3. A scaleable computer system constructed of replicatable semiconductor chips in one or more nodes, as defined in claim 2, wherein said
intra-nodal electronic switch connects each nodal cache chip to each processor chip in the same node for transferring data requested by any processor in the computer system under control of the connected nodal directory.

4. A scaleable computer system constructed of replicatable semiconductor chips in one or more nodes, as defined in claim 3, wherein
the intra-nodal electronic switch for the nodal directory and is fabricated on the same chip that contains the nodal directory.

5. A scaleable computer system constructed of replicatable semiconductor chips in one or more nodes, as defined in claim 4, wherein said intra-nodal electronic swich is
the intra-nodal electronic switch for each nodal cache chip and is also fabricated on the same chip that contains the nodal cache chip.

6. A scaleable computer system constructed of replicatable semiconductor chips in one or more nodes, as defined in claim 3, further comprising
a plurality of the nodes in the computer system, and
one or more internodal buses connecting the nodal cache and nodal directory in each of the plurality of nodes to the nodal cache and nodal directory in each other node in the computer system.

7. A scaleable computer system constructed of replicatable semiconductor chips in one or more nodes, as defined in claim 6,
an internodal electronic switch in each node connects the nodal directory of that node to an nodal directory in each other node in the computer system.

8. A scaleable computer system constructed of replicatable semiconductor chips in one or more nodes, as defined in claim 7, wherein said
internodal electronic switch for each node connects that node's nodal cache chip to a corresponding nodal cache chip in the nodal cache of each other node in the computer system.

9. A scaleable computer system constructed of replicatable semiconductor chips in one or more nodes, as defined in claim 8, wherein each RAM section (connected to a processor chip) is divided into RAM line units capable of storing a line of data which can be retrieved by a memory controller section on the connected processor chip using a RAM address, the addresses in a RAM section being unique within the respective RAM section and not being required to be unique with RAM addresses of other RAM sections in the system shared memory, and all of the RAM sections in the computer system are controlled as the system shared memory.

10. A scaleable computer system constructed of replicatable semiconductor chips in one or more nodes, as defined in claim 9, further comprising a range of unique real addresses being assigned to different byte locations in the system shared memory, the real addresses being byte addresses in the shared memory usable by programs executing on processors in the processor chips in the computer system for enabling any processor on any chip in the computer system to access data and programs located in the shared memory by program-defined addresses, and address conversion controls provided in each processor chip to convert program-defined addresses of the shared memory to RAM addresses for locating required RAM addresses in any RAM section of any node in the computer system.

11. A scaleable computer system constructed of replicatable semiconductor chips in one or more nodes, as defined in claim 10, further comprising each RAM address on each respective RAM section being made unique in the system shared memory by being appended to a unique processor chip identifier (ID) in the computer system, for which each shared memory address is comprised at least a processor chip identifier (ID) and a RAM address.

12. A scaleable computer system constructed of replicatable semiconductor chips in one or more nodes, as defined in claim 11, further comprising the unique processor chip ID containing a node address for the node containing the processor chip, each node having a unique node address in the computer system to require the appended chip IDs to only be unique within its node.

13. A scaleable computer system constructed of replicatable semiconductor chips in one or more nodes, as defined in claim 12, further comprising the processor on each processor chip built according to a particular computer architecture for executing programs written to the architecture, and the address conversion controls converting addresses in the executing programs to required RAM addresses for accessing required data in any required RAM section in the computer system.

14. A scaleable computer system constructed of replicatable semiconductor chips in one or more nodes, as defined in claim 13, further comprising address communication controls on each processor chip for communicating program addresses external of the processor chip after conversion to RAM addresses by the address conversion controls.

15. A scaleable computer system constructed of replicatable semiconductor chips in one or more nodes, as defined in claim 14, wherein memory real address space in each RAM section is divided into multiple address spaces comprising, a first memory space being accessible to programs executing on any processor chip in the computer system, and a second memory space being a hardware memory accessible only to microcode executed by a processor on the connected processor chip and not accessible to programs executing on any processor chip in the computer system.

16. A scaleable computer system constructed of replicatable semiconductor chips in one or more nodes, as defined in claim 15, further comprising the first and second memory spaces of each RAM section containing a respective range of RAM addresses, and only the RAM addresses in the first memory space (which is a portion of the shared memory) being supported by the address conversion controls for conversion from program addresses into RAM addresses.

17. A scaleable computer system constructed of replicatable semiconductor chips in one or more nodes, as defined in claim 16, further comprising the address conversion controls assigning the RAM addresses in the first memory space of each RAM section to a range of unique program byte addresses to enable accessing of required data locations in the RAM sections when program addresses are being generated by a program executing in a processor in any processor chip in the computer system.

18. A scaleable computer system constructed of replicatable semiconductor chips in one or more nodes, as defined in claim 17, further comprising a unique processor identifier (ID) separate from the processor chip ID being assigned to each processor in each processor chip when any processor chip contains plural processors which can access the system shared memory, each system unique RAM address comprised of a processor ID, a processor chip ID and the RAM address of the respective RAM section, for which the RAM address need only be unique within its RAM section.

19. A scaleable computer system constructed of replicatable semiconductor chips in one or more nodes, as defined in claim 18, further comprising each nodal directory owning the RAM sections connected to processor chips in the same node as the owning nodal directory, each owning nodal directory storing all RAM addresses accessed in its owned RAM sections, each RAM address having been converted from a program address to a RAM address prior to being sent to the owning nodal directory, each requested address identifying the requesting processor and identifying the RAM section containing the requested address, and the nodal cache (connected to the owning nodal directory) receiving and storing a copy of data accessed in any RAM section in the same node, the accessed data remaining in the RAM section and backing the copy of the data stored in the nodal cache.

20. A scaleable computer system constructed of replicatable semiconductor chips in one or more nodes, as defined in claim 19, and when the computer system has more than one node further comprising the owning nodal directory receiving requested addresses from local processors in the same node and from remote nodal directory(s) in a computer system when the computer system has more than one node, each requested address identifying the requesting processor and identifying the RAM section containing the requested address, each owning nodal directory searching for each received requested address and optionally storing the requested address if not found in a valid entry in the owning nodal directory, and the nodal cache (connected to the owning nodal directory) receiving and optionally storing a data line fetched by the memory controller of the processor chip connected to the identified RAM section.

21. A scaleable computer system constructed of replicatable semiconductor chips in one or more nodes, as defined in claim 20, and when the computer system has more than one node further comprising the owning nodal directory forwarding the requested address to the processor chip connected to the identified RAM section when the requested address has not been provided by the processor chip connected to the requested RAM section, the connected processor chip using the requested address to access an addressed data line in the identified RAM section, and the processor chip sending the data line to the owning nodal cache when the requested address has not been provided by the processor chip connected to the identified RAM section, and the owning nodal directory forwarding a copy of the requested data line to a remote nodal cache when the requested address was received from a connected remote nodal directory in another node, and the remote nodal directory forwarding a copy of the requested data line from its connected nodal cache to the requesting remote processor.

22. A scaleable computer system constructed of replicatable semiconductor chips in one or more nodes, as defined in claim 21, further comprising coherence controls in each nodal directory utilizing control information in each valid nodal directory entry, including a stored requesting processor ID and a stored ID of the RAM section containing the requested RAM address, for maintaining coherence over multiple copies of a requested data line copied to one or more L1 and nodal caches, any of which may have been modified by a processor in the computer system.

23. A scaleable computer system constructed of replicatable semiconductor chips in one or more nodes, as defined in claim 22, further comprising an authority indicator also being stored in each valid nodal directory entry in each nodal directory in the computer system to indicate an access authority temporarily given to a requesting processor over a requested RAM data line, including read only and store authorities.

24. A scaleable computer system constructed of replicatable semiconductor chips in one or more nodes, as defined in claim 23, further comprising coherence communication controls with each nodal directory for communicating with each other nodal directory in the computer system involved with accessing the same RAM data line to maintain coherence for all data in the system shared memory.

25. A scaleable computer system constructed of replicatable semiconductor chips in one or more nodes, as defined in claim 24, further comprising each valid data line being simultaneously storeable in one or more private processor cache(s) and/or nodal cache (s) in the computer system, the same data line being backed in the RAM section identified in a corresponding nodal directory entry in a connected nodal directory at the requested RAM address, and store back controls in the nodal directory(s), the nodal cache(s) and private processor cache(s) for later storing any latest changed version of the data line back into the requested address in the identified RAM section.

26. A scaleable computer system constructed of replicatable semiconductor chips in one or more nodes, as defined in claim 25, further comprising the store back controls and the coherence communication controls utilizing intra-nodal buses in the node of the owning nodal directory, and internodal buses for connecting to each remote nodal directory having the requesting processor ID.

27. A scaleable computer system constructed of replicatable semiconductor chips in one or more nodes, as defined in claim 26, further comprising the coherence communication controls of each owning nodal directory coordinating all coherence operations throughout the computer system for all data lines stored in all RAM sections owned by the owning nodal directory by communicating coherence signals to each non-owning (remote) nodal directory containing an identifier of an owned RAM section.

28. A scaleable computer system constructed of replicatable semiconductor chips in one or more nodes, as defined in claim 27, further comprising coherence enforcement controls with each nodal directory operating differently with owned data and non-owned data stored in the nodal cache connected to the nodal directory, the owned data being backed by RAMs owned by the nodal directory, and the non-owned data not being backed by RAMs owned by the nodal directory but being backed by RAMs in a remote node, invalidation controls in the coherence enforcement controls of the nodal directory operating with owned data to coordinate invalidation of copies of the owned data in all nodes of the computer system when copy invalidation is required to maintain coherence of the owned data in the shared system memory, and write-back controls in the coherence enforcement controls of the nodal directory operating with owned data to coordinate a write-back of owned data into a backing RAM section after the owned data is changed by any processor in the computer system.

29. A scaleable computer system constructed of replicatable semiconductor chips in one or more nodes, as defined in claim 28, further comprising the invalidation controls of the non-owning nodal directory operating only to invalidate copies of non-owned data in the connected nodal cache and in any private processor cache(s) within the node.

30. A scaleable computer system constructed of replicatable semiconductor chips in one or more nodes, as defined in claim 29, further comprising coherence signaling controls with each nodal directory for signaling to an owning nodal directory of an authority change request for a copy of the non-owned data in the node of a non-owning nodal directory to enable the owning nodal directory to coordinate an authority change for the data in all nodes of the computer system.

31. A scaleable computer system comprised of one or more system sections sharing a shared memory, each system section containing a plurality of system cells, a sectional cache and directory, and electronic switches and intra-section buses connecting the cells to the sectional cache and directory, and wherein each sectional cache stores a fraction of each line of data (each data line) stored in the sectional cache, each data line being a unit of data determined by a single access in the shared memory, each system cell being comprised of: a processor semiconductor chip (processor chip), a local memory, and a local bus connecting the local memory to the processor chip, the local memory being a subset of a system memory having said shared memory for storing data and instructions sharable by central processors located in any of the cells in the system, each processor chip containing at least one central processor, a processor cache, and a subset memory controller interface, an intra-section bus connecting each processor chip to the sectional cache and directory through the electronic switches within the section, the electronic switches having a switching capacity for connecting future buses between cells later added into the section and the sectional cache and directory, and coherence controls being provided with entries in the directory for controlling the coherency of data and instructions communicated between the cells in the system., and wherein the subset memory controller interface includes an independent controller processor on the chip connected between the local memory bus and each central processor on the chip, and the controller processor is also connected to an intra-sectional bus for transferring commands, memory requests and data to and from the sectional directory and sectional cache.

* * * * *

UNITED STATES PATENT AND TRADEMARK OFFICE
CERTIFICATE OF CORRECTION

PATENT NO.    : 6,457,100 B1
DATED         : September 24, 2002
INVENTOR(S)   : Michael Ignatowski et al.

It is certified that error appears in the above-identified patent and that said Letters Patent is hereby corrected as shown below:

<u>Title page,</u>
Item [75], Inventors, "Gottfried Andreas Goldiran" should read
-- Gottfried Andreas Goldrian --.

Signed and Sealed this

Thirtieth Day of September, 2003

JAMES E. ROGAN
*Director of the United States Patent and Trademark Office*